(12) United States Patent
Kim

(10) Patent No.: US 11,486,431 B2
(45) Date of Patent: Nov. 1, 2022

(54) ASSEMBLY-TYPE CHAIR

(71) Applicant: DUOBACK CO., LTD., Incheon (KR)

(72) Inventor: Geon Woo Kim, Incheon (KR)

(73) Assignee: DUOBACK CO., LTD, Incheon (KR)

(*) Notice: Subject to any disclaimer, the term of this patent is extended or adjusted under 35 U.S.C. 154(b) by 75 days.

(21) Appl. No.: 16/843,120

(22) Filed: Apr. 8, 2020

(65) Prior Publication Data

US 2021/0018027 A1  Jan. 21, 2021

(51) Int. Cl.
| | |
|---|---|
| *A47C 3/04* | (2006.01) |
| *F16B 12/40* | (2006.01) |
| *A47C 4/02* | (2006.01) |
| *F16B 12/44* | (2006.01) |
| *A47C 5/10* | (2006.01) |
| *A47C 4/20* | (2006.01) |

(52) U.S. Cl.
CPC .............. *F16B 12/40* (2013.01); *A47C 3/045* (2013.01); *A47C 4/02* (2013.01); *A47C 4/20* (2013.01); *A47C 5/10* (2013.01); *F16B 12/44* (2013.01); *F16B 2012/446* (2013.01)

(58) Field of Classification Search
CPC .... A47C 4/02; A47C 4/03; A47C 4/04; A47C 3/045; A47C 3/12; A47C 1/024; A47C 3/04; F16B 12/40; F16B 12/44; F16B 2012/446; F16B 2012/403
USPC ... 297/440.1, 452.11, 452.19, 325–328, 239, 297/445.1
See application file for complete search history.

(56) References Cited

U.S. PATENT DOCUMENTS

| | | | | |
|---|---|---|---|---|
| 2,747,654 | A * | 5/1956 | Chapman | A47C 7/002 297/188.12 |
| 3,982,785 | A * | 9/1976 | Ambasz | A47C 1/023 297/160 |
| 5,738,408 | A * | 4/1998 | Wu | A47C 3/04 297/239 |
| 6,595,584 | B1 * | 7/2003 | Caldwell | A47C 11/005 297/258.1 |
| 6,755,468 | B1 * | 6/2004 | Pan | A47C 3/045 297/239 |
| 7,717,511 | B2 * | 5/2010 | Huang | A47C 7/54 297/239 |
| 10,064,491 | B2 * | 9/2018 | Piretti | A47C 5/10 |
| 2003/0090137 | A1 * | 5/2003 | Piretti | A47C 3/045 297/335 |
| 2005/0146178 | A1 * | 7/2005 | Hergesell | A47C 1/124 297/239 |
| 2005/0264072 | A1 * | 12/2005 | Perry | A47C 1/024 297/302.1 |

(Continued)

FOREIGN PATENT DOCUMENTS

| | | |
|---|---|---|
| CA | 2311234 | 10/2009 |
| KR | 101101874 B1 | 1/2012 |

*Primary Examiner* — Bradley Duckworth
(74) *Attorney, Agent, or Firm* — DeLio Peterson & Curcio LLC; Brian G. Schlosser

(57) ABSTRACT

The present disclosure relates to an assembly-type chair and provides an assembly-type chair that has a specific structure, thereby conveniently storing and transporting the chair with a minimized volume, and has a structure in which a chair body part including a seat plate and a backrest is rotatable, thereby effectively storing a plurality of chairs by stacking the chairs in the horizontal direction so as to be in close contact with each other.

3 Claims, 10 Drawing Sheets

(56) References Cited

U.S. PATENT DOCUMENTS

| | | | |
|---|---|---|---|
| 2007/0120406 A1* | 5/2007 | Piretti | A47C 3/04 297/331 |
| 2007/0222266 A1* | 9/2007 | Lucci | A47C 3/045 297/331 |
| 2009/0273214 A1* | 11/2009 | Shields | A47C 3/04 297/239 |
| 2010/0194160 A1* | 8/2010 | Machael | A47C 3/045 297/239 |
| 2011/0175412 A1* | 7/2011 | Piretti | A47C 3/045 297/239 |
| 2012/0248830 A1* | 10/2012 | Pan | A47C 3/045 297/55 |
| 2013/0038110 A1* | 2/2013 | Deisig | A47C 3/045 297/354.12 |
| 2015/0282622 A1* | 10/2015 | Kumazawa | A47C 3/045 297/335 |

* cited by examiner

ASSEMBLY-TYPE CHAIR

BACKGROUND OF THE INVENTION

1. Field of the Invention

The present disclosure relates to an assembly-type chair, and more particularly, to an assembly-type chair having a specific structure capable of separating the same into a plurality of members and selectively assembling the chair to be used.

2. Description of the Prior Art

In general, a chair is provided to maintain a seated state in carrying out work and study using a desk or a table in various places including a home, an office, a school, a private institute, a library, various public institutes, and the like.

The chair is configured to include a body part, which has a seat plate on which a user is seated and a backrest provided at the rear side of the seat plate, and a plurality of support legs installed in the lower portion of the body part so as to extend a predetermined length from the lower surface of the seat plate.

The chair is manufactured and distributed in any of various sizes, shapes, materials, or the like according to users using the chair, places in which the chair is used, or usage thereof.

However, the conventional chair occupies a large volume due to its characteristics, and even when some parts of the chair are implemented to be assemblable, there is a problem in that the efficiency of storage and transportation is reduced.

Meanwhile, a place in which many people gather, such as a school auditorium, a gymnasium, various event halls, a large conference room, and the like, requires a large number of chairs according to the number of users. In this case, it is very difficult to store or transport the multiple chairs.

That is, in order to store a large number of conventional chairs, a method of stacking the chairs in the vertical direction is generally used in consideration of the structural feature of the conventional chair. However, stacking a large number of chairs in the vertical direction inevitably requires much labor and time, and the stacking height is also very limited.

In addition, in the case where a large number of chairs are required to be carried, a small number of chairs must be carried in the stacked state, or the chairs must be carried one by one, which significantly reduces the efficiency of transportation of the chair.

SUMMARY OF THE INVENTION

Accordingly, the present disclosure has been made in order to solve the conventional problems as described above, and an aspect of the present disclosure is to provide an assembly-type chair that has a specific structure including a plurality of rod members, thereby conveniently storing and carrying the chairs with a minimized volume and easily assembling and using the chair.

Another aspect of the present disclosure is to provide an assembly-type chair that has a structure in which a body part thereof including a seat plate and a backrest is rotatable, thereby efficiently storing a plurality of chairs in a close contact with each other by stacking the chairs from front to back.

In order to solve the above technical problems, an assembly-type chair according to the present disclosure may include: a body part including a seat plate and a backrest, which are integrally formed; a horizontal bar horizontally disposed under the body part; a pair of rotating members fixed to a lower surface of the body part so as to be parallel with each other and rotatable by a predetermined angle about the horizontal bar; a pair of front support legs including a rod member having a predetermined length; a pair of rear support legs including a rod member having a predetermined length; and a pair of connectors fixed to both ends of the horizontal bar, respectively, to each of which one front support leg and one rear support leg are mounted, wherein the connector is formed in a tube having a "┬" shape, and has a front insertion protrusion integrally coupled to one end thereof so as to be inserted and mounted into the horizontal bar and a coupling protrusion integrally coupled to the lower end thereof so as to be mounted to the upper end of the rear support leg, and wherein a rear insertion protrusion is formed to protrude from the portion at a predetermined height in the front support leg so as to pass through the connector to be received in the front insertion protrusion.

According to the present disclosure configured as described above, since an assembly-type chair has a specific structure including a body part and a plurality of rod members, the body part including a seat plate and a backrest, the chair is able to be conveniently stored and carried in a separated state of the chair with a minimized volume, and the user is able to easily assemble and use the chair by means of corresponding parts.

In addition, since a body part including a seat plate and a backrest is configured to be selectively foldable, it is possible to effectively store a large amount of chairs by stacking the chairs from front to back so as to be in close contact with each other and to effectively transport a large number of chairs stacked from front to back at the same time.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
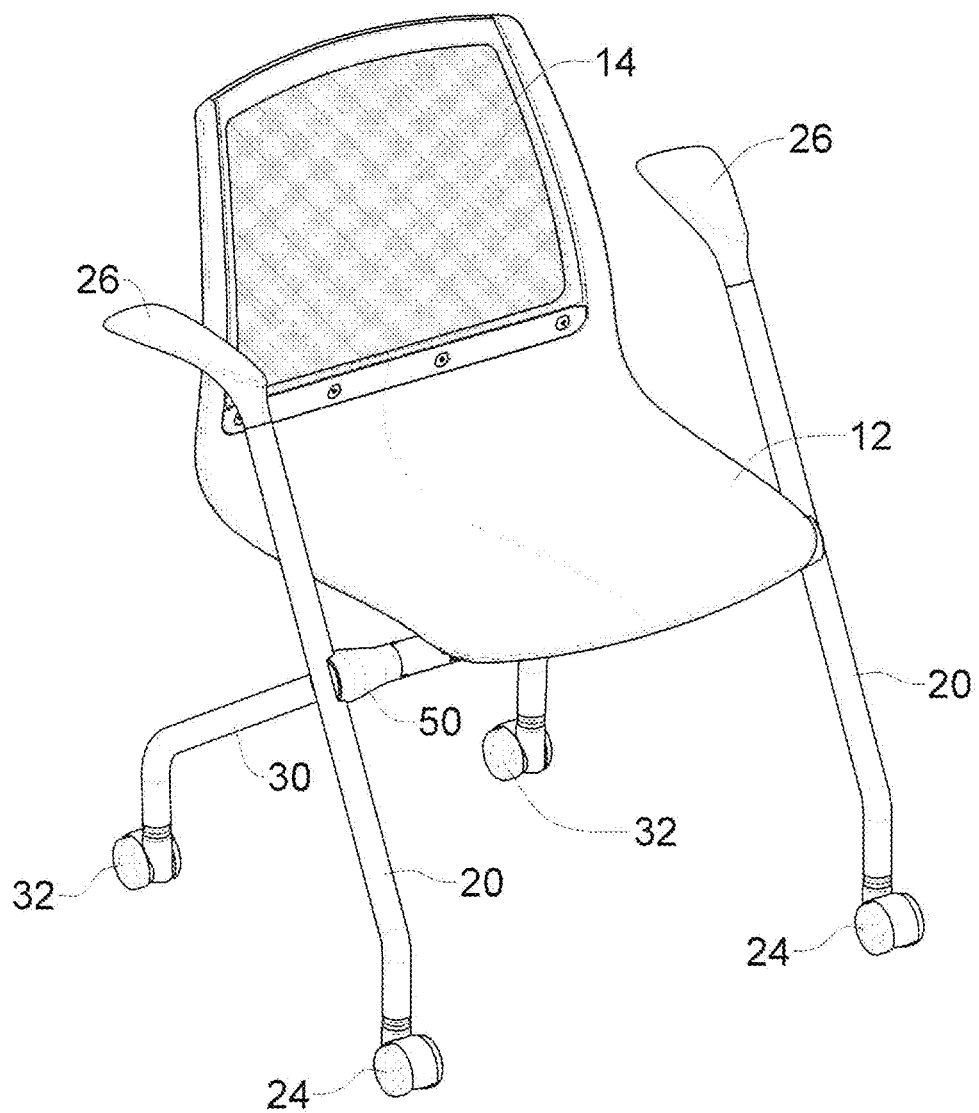
FIG. 1 is an upper perspective view showing an assembled state of an assembly-type chair according to the present disclosure.
Figure 2:
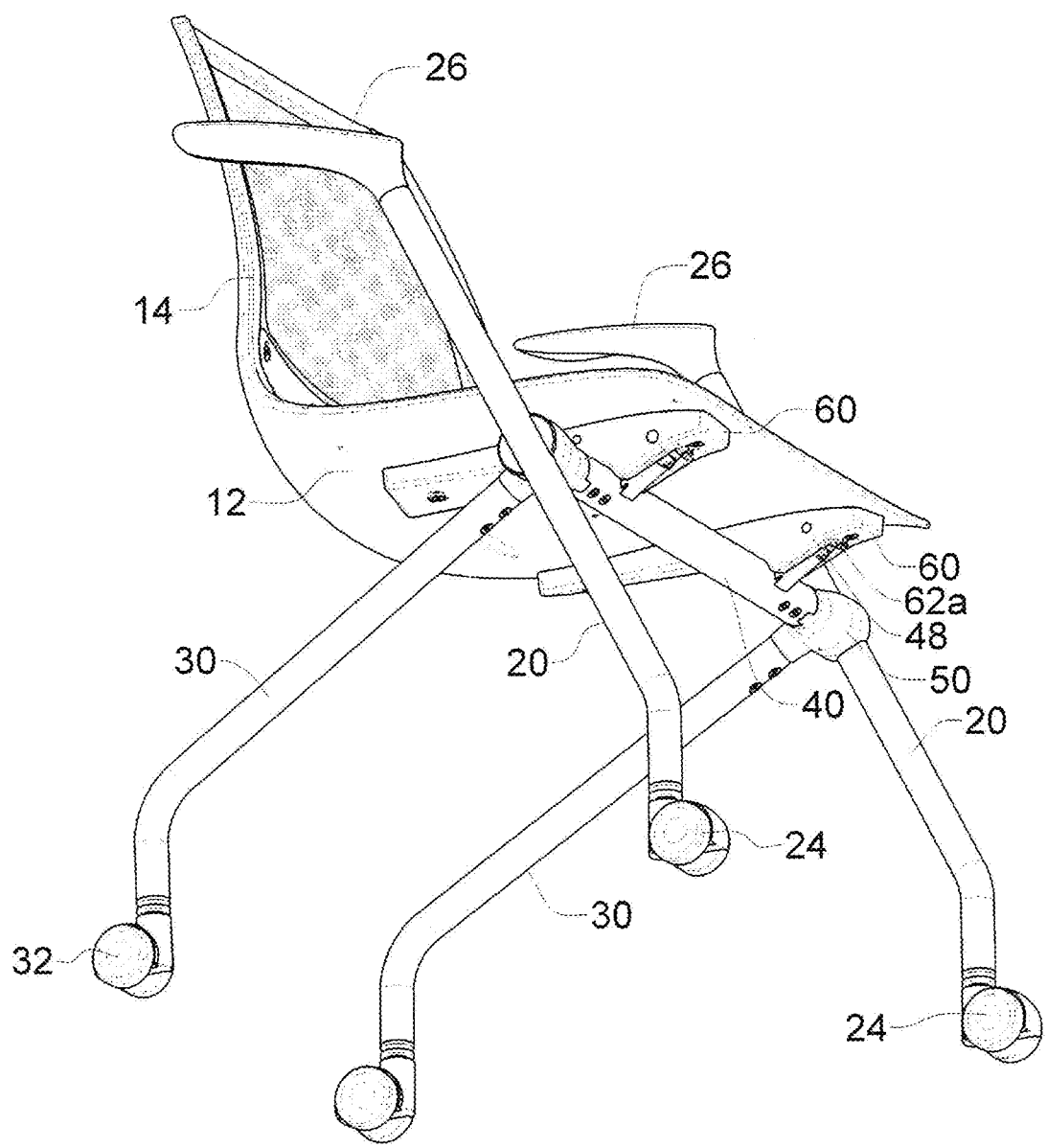
FIG. 2 is a bottom perspective view showing the assembled state of an assembly-type chair according to the present disclosure.
Figure 3:
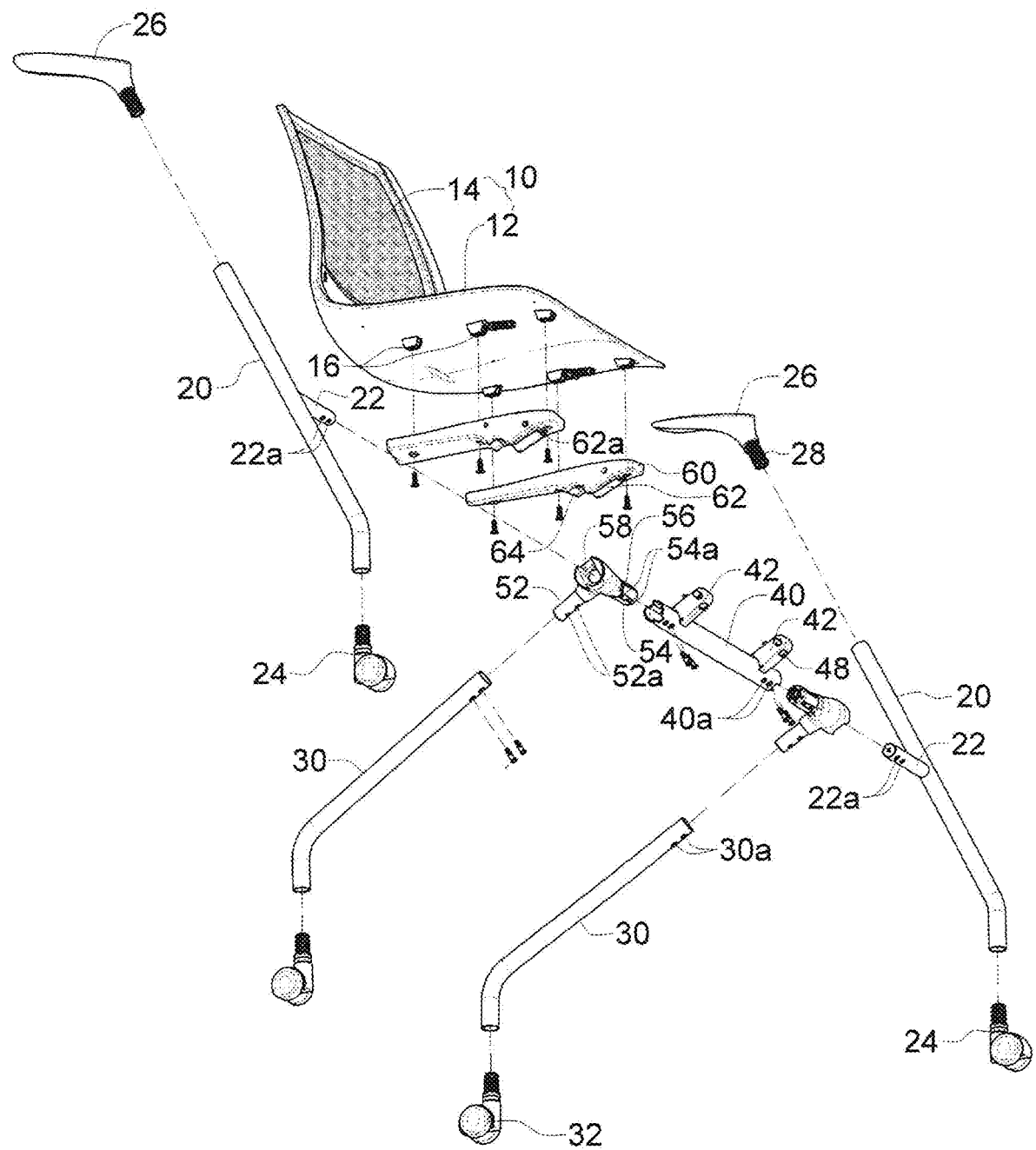
FIG. 3 is an exploded perspective view showing the configuration of an assembly-type chair according to the present disclosure.

Hereinafter, the present disclosure configured as described above will be described in detail with reference to the accompanying drawings.

First, an assembly-type chair according to the present disclosure is implemented to have a specific structure including a body part and a plurality of rod members, thereby facilitating storing and carrying the chair with a minimized volume and selectively folding the chair body part including a seat plate and a backrest in an assembled state thereof.

As shown in FIGS. 1 to 5, an assembly-type chair according to the present disclosure is configured to include: a body part 10 including a seat plate 12 and a backrest 14, which are integrally formed with each other; a horizontal bar 40 disposed under the body part 10; a pair of front support legs 20 and a pair of rear support legs 30 constituting chair legs; a pair of rotating members 60 provided to rotate the body part 10 by a predetermined angle; and a pair of connectors 50 provided at both ends of the horizontal bar 40, to which respective ones of the front support legs 20 and rear support legs 30 are integrally mounted.

The body part 10 includes a seat plate 12 in a substantially rectangular shape seated by a user and a backrest 14 integrally formed at the rear portion of the seat plate 12 so as to be approximately perpendicular thereto. A total of six screw fastening portions 16 are arranged to protrude from the lower surface of the seat plate 12 so as to be arranged side by side at predetermined positions such that the pair of rotating members 60 are fixed thereto in parallel to each other.

The horizontal bar 40 is formed in a rod shape having a predetermined length and is disposed in a horizontal state under the body part 10. A pair of protrusions 42 is formed to protrude from predetermined positions of the outer surface of the horizontal bar 40 so as to be inclined while being spaced a predetermined distance apart from each other such that the pair of rotating members 60 is mounted to the pair of protrusions 42 to be rotatable.

Each of the protrusions 42 has a side in a substantially "11" shape and a rotation-shaft through-hole 44 formed to passing through the protrusion 42 from the left and to the right. In addition, a substantially rod-shaped support protrusion 46 for supporting one end of the spring 80 is formed to protrude from the center of the upper surface of the protrusion 42, and a fixing protrusion 48 in a substantially rectangular plate is formed to protrude from the lower surface of the protrusion 42 so as to be perpendicular to the surface thereof.

In addition, a pair of coupling holes 40a is formed at both ends of the horizontal bar 40.

The pair of front support legs 20 is made of a rod member having a predetermined length and is coupled to the both ends of the body part 10 by means of the connectors 50 at a predetermined angle. In addition, the lower end of the front support leg 20 is bent to vertically extend and has a caster 24 mounted thereto.

A rear insertion protrusion 22 in the form of a rod is formed to protrude from the portion at a predetermined height in each front support leg 20 so as to pass through the connector 50, and has a pair of coupling holes 22a formed therein.

Armrests 26 in the form of a bar are provided to be installed to the upper ends of the respective front support legs 20 so as to be located on both sides of the seat plate 12 of the body part 10.

Figure 4:
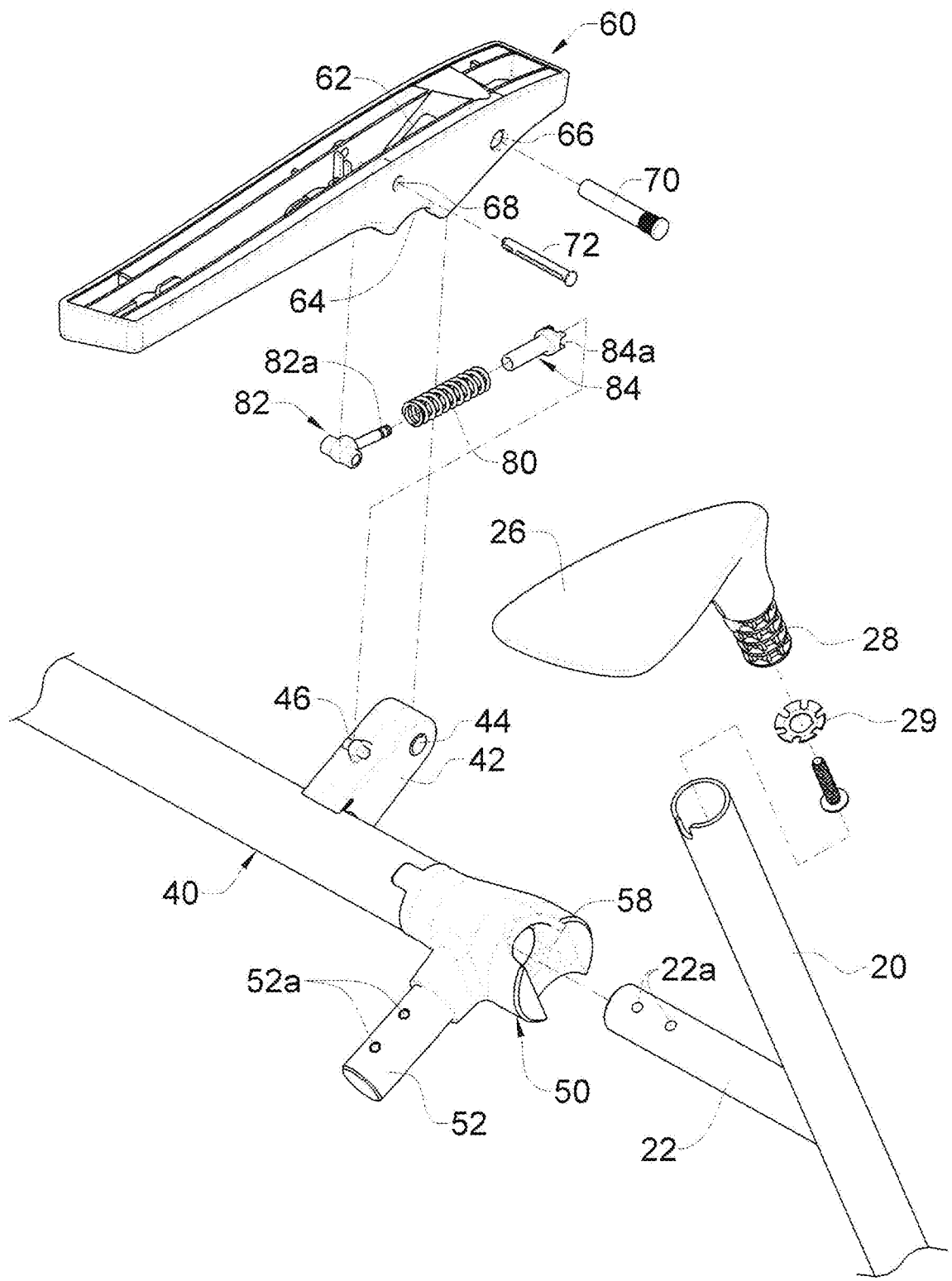
FIG. 4 is a partially enlarged and exploded perspective view showing the configuration of an assembly-type chair according to the present disclosure.
Figure 5:
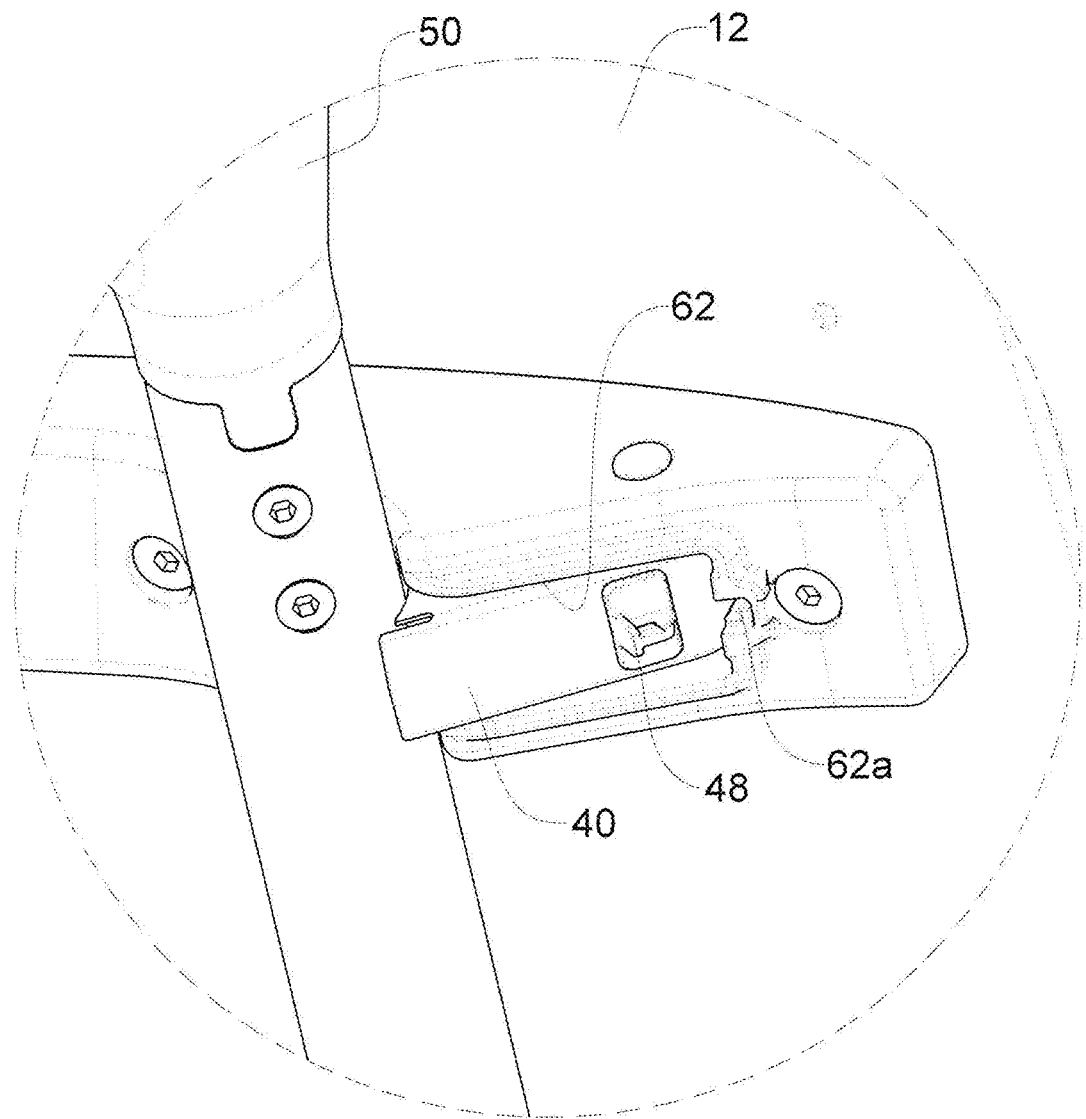
FIG. 5 is a partially enlarged perspective view showing the configuration of an assembly-type chair according to the present disclosure.

The armrest 26 may be fixed to the upper end of the front support leg 20 by means of an insertion rod 28 that protrudes from the lower surface of the armrest 26 to be perpendicular thereto and is firmly mounted to the inside of the front support leg 20 by means of a push nut 29 (see FIG. 4).

The armrest 26 may be designed in any of various shapes to provide a unique aesthetic sense.

The pair of rear support legs 30 is made of a rod member having a predetermined length and is coupled to the both ends of the body part 10 by means of the connectors 50 at a predetermined angle. A pair of coupling holes 30a is formed at the upper end of the rear support leg 30, and the lower end of the rear support leg 30 is bent to vertically extend and has a caster 24 mounted thereto.

The connectors 50 are fixed to the both ends of the horizontal bar 40 such that one front support leg 20 and one rear support leg 30 are mounted to each of the connectors 50. The connector 50 is formed in a tube having a substantially "┬" shape and has a front insertion protrusion 54 integrally coupled to one end thereof so as to be inserted and mounted to the end of the horizontal bar 40 and a coupling protrusion 52 integrally coupled to the lower end thereof so as to be inserted and mounted to the upper end of the rear support leg 30.

A pair of coupling holes 52a and 54a is formed in the front insertion protrusion 54 and the coupling protrusion 52, respectively.

Reference numeral 56 denotes a cap for eliminating a tolerance in order to prevent the front insertion protrusion 54 from moving while being inserted into the end of the horizontal bar 40.

The pair of rotating members 60 is fixed in parallel to each other to a plurality of screw fastening portions 16 protruding from the lower surface of the body part 10 so as to be rotatable by a predetermined angle about the horizontal bar 40.

Each rotating member 60 has a substantially bar-shaped body and an installation groove 62 formed in the lower surface of the front end thereof to correspond to the protrusion 42 of the horizontal bar 40, and rotation-shaft through-holes 66 are formed in both side walls of the installation groove 62.

In addition, a fixing groove 62a is provided to extend from the installation groove 62 to the front such that the fixing protrusion 48 of the protrusion 42 may be selectively inserted and fixed thereto.

Accordingly, a rotation shaft 70 passes through the respective rotation-shaft through-holes 44 and 66, which are aligned with each other, in the state in which the protrusion 42 of the horizontal bar 40 is received in the installation groove 62, so that the rotating member 60 is mounted to the horizontal bar 40 so as to be rotatable.

In addition, the horizontal-bar seating groove 64 is formed at a predetermined position in the lower surface of the rotating member 60 corresponding to the horizontal bar 40 so as to be recessed in a substantially semicircular shape conforming to the outer circumferential surface of the horizontal bar 40 such that the horizontal-bar seating groove 64 is selectively seated on the horizontal bar 40.

Meanwhile, each of the rotating member 60 is provided with a spring 80 installed to provide an effective rotation operation relative to the horizontal bar 40.

One end of the spring 80 is associated with the rotating member 60 by means of a first spring mounting member 82, and the opposite end of the spring 80 is associated with the protrusion 42 of the horizontal bar 40 by means of a second spring mounting member 84.

The first spring mounting member 82 is formed in a substantially "1" shape to have a tubular body and an insertion protrusion 82a protruding from one side of the tubular body. The first spring mounting member 82 is installed by a fixing shaft 70 passing through auxiliary rotation-shaft through-holes 68 and the tubular body while the first spring mounting member 82 is received in the rotating member 60, and the insertion protrusion 82a is inserted into one end of the spring 80.

The second spring mounting member 84 has a substantially rod-shaped body inserted into the opposite end of the spring 80 and a circular fitting groove 84a formed at the rear end of the rod-shaped body to be open at its one side so that the support protrusion 46 provided in the protrusion 42 of the horizontal bar 40 is selectively engaged with the fitting groove 84a.

Now, the operation of the present disclosure configured as described above will be described with reference to the drawings.

An assembly-type chair according to the present disclosure is provided to include a pair of rotating members 60 having a spring 80 provided therein and fixed to the lower surface of the seat plate 12 of the body part 10, and the pair of rotating members 60 are coupled to a pair of protrusions 42 provided on the horizontal bar 40 so as to be rotatable by means of the rotation shaft 70.

Thus, the body part 10 is installed so as to be selectively folded by a predetermined angle relative to the horizontal bar 40.

In addition, the horizontal bar 40 to which the body part 10 is mounted is assembled integrally with a pair of front support legs 20 and a pair of rear support legs 30 by means of the connectors 50, thereby constituting a chair having a predetermined shape.

That is, the rear insertion protrusion 22 of the front support leg 20 passes through the connector 50 horizontally so as to be received in the front insertion protrusion 54, and the front insertion protrusion 54 is inserted into one end of the horizontal bar 40. In this state, screws are engaged with a plurality of coupling holes 22a, 40a, and 54a, which are formed in the horizontal bar 40, the front insertion protrusion 54, and the rear insertion protrusion 22 so as to be aligned with each other, so that the horizontal bar 40 and the front support legs 20 can be firmly coupled to each other by means of the connectors 50.

In addition, screws are engaged with a plurality of coupling holes 30a and 52a, which are formed in the rear support leg 30 and the coupling protrusion 52 so as to be aligned with each other, in the state in which the upper end of the rear support leg 30 is inserted into the coupling profusion 52 of the connector 50, so that the horizontal bar 40 and the rear support legs 30 can be firmly coupled to each other by means of the connector 50.

The pair of front support legs 20 and the pair of rear support legs 30 are fixed to both ends of the horizontal bar 40 in the same structure.

In addition, the armrests 26 are mounted to the upper ends of the front support legs 20, thereby completing the assembly of the chair.

When using the chair, the seat plate 12 of the body part 10 is unfolded to maintain a horizontal state thereof. At this time, the horizontal-bar seating groove 64 of the rotating member 60 is supported by the outer circumferential surface of the horizontal bar 40, and the fixing protrusion 48 provided in the protrusion 42 of the horizontal bar 40 is fitted into the fixing groove 62a of the rotating member 60, thereby stably maintaining the fixed state of the body part of the chair (see FIG. 5).

Figure 6A:
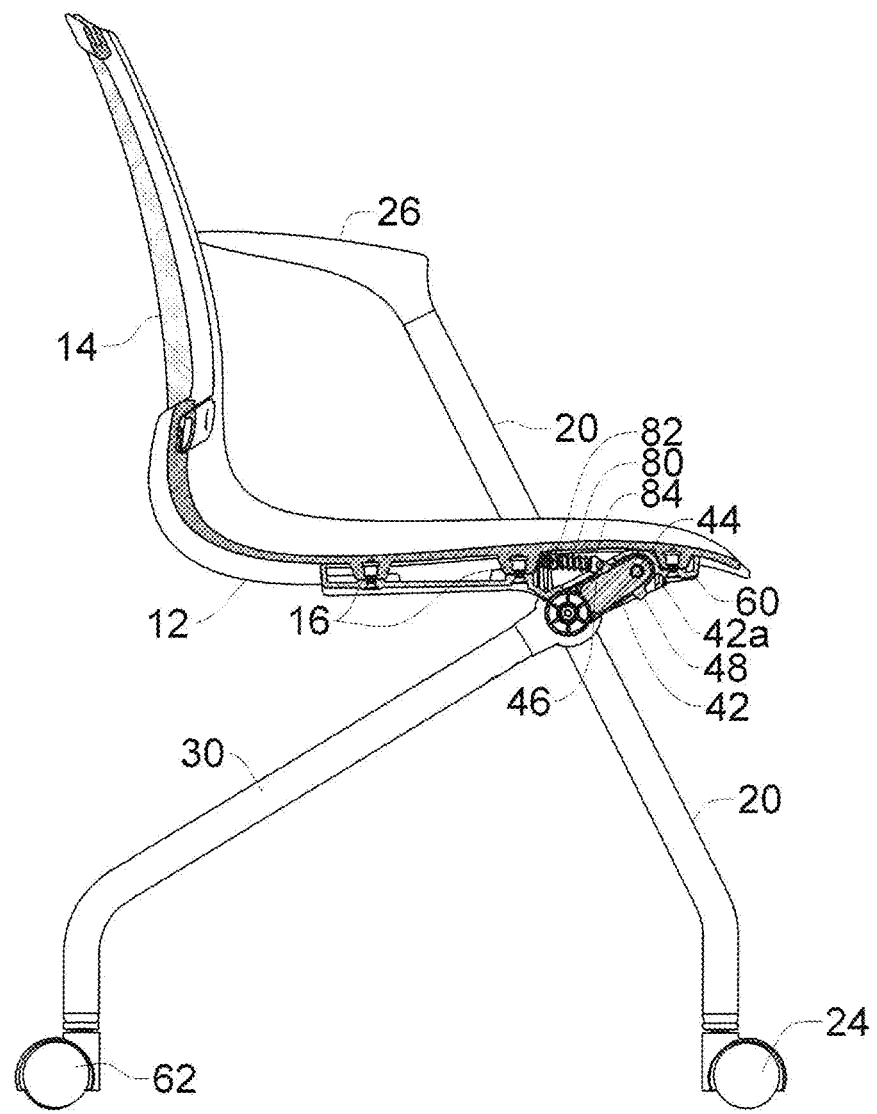
FIGS. 6A and 6B are a one-sided cross-sectional view and a side view, respectively, showing an assembly-type chair in an unfolded state according to the present disclosure.
Figure 6B:
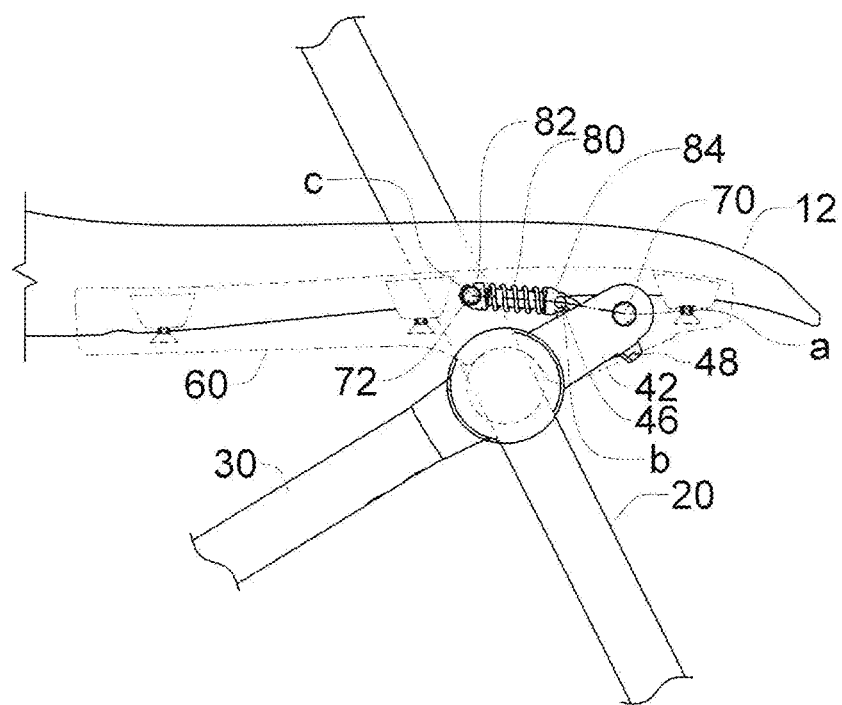

In the state of using the chair as described above, the spring 80 is contracted from the original state thereof and is maintained to be horizontal as shown in FIGS. 6A and 6B. At this time, a reference point "a" formed by the rotation shaft 70, a center point "b" formed by one end of the spring 80, and a moving point "c" formed by the opposite end of the spring 80 are approximately in line with each other.

Figure 7A:
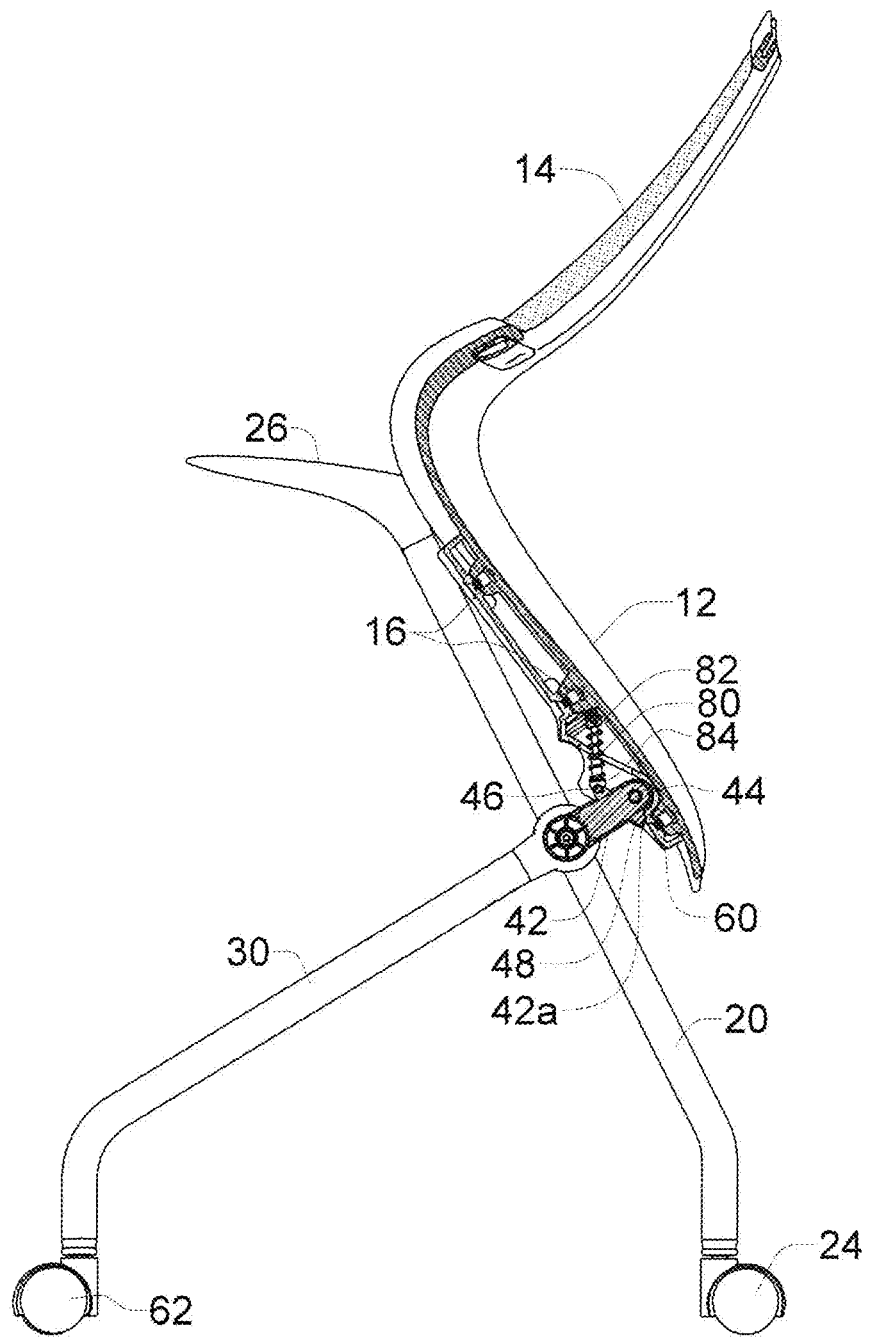
FIGS. 7A and 7B are a one-sided cross-sectional view and a side view, respectively, showing an assembly-type chair in a folded state according to the present disclosure.
Figure 7B:
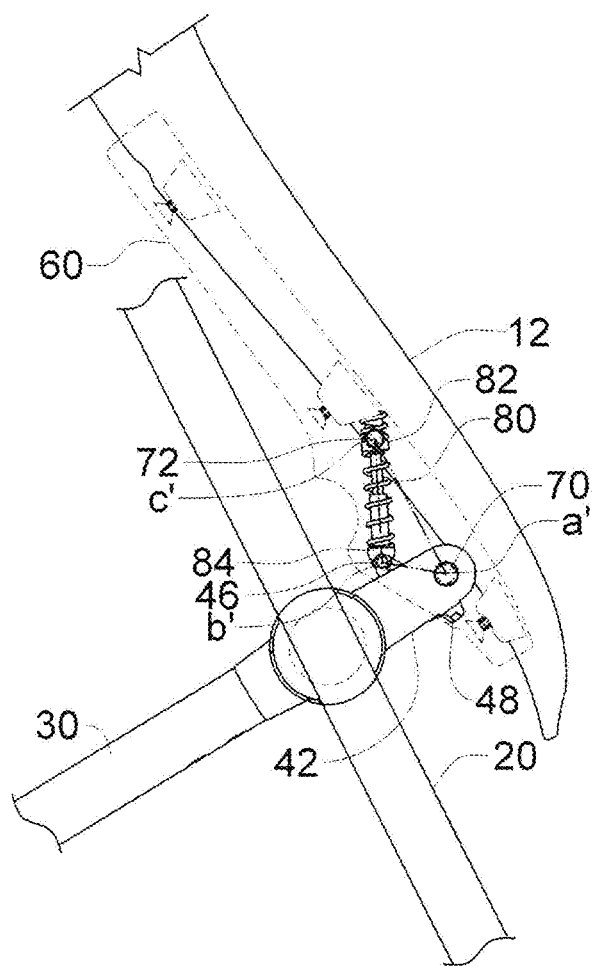

When storing the chair, if the seat plate 12 of the body part 10 is folded by a predetermined angle, as shown in FIGS. 7A and 7B, the spring 80 enters a vertical state while being extended, compared to the original state thereof.

At this time, when the chair switches from the unfolded state (FIGS. 6A and 6B) to the folded state (FIGS. 7A and 7B), the moving point "c", which is substantially in line with the reference point "a" and the center point "b", rotates clockwise.

When the moving point "c" rotates clockwise, the spring 80 in the contracted state generates a tensile force while switching from the horizontal state to the vertical state so as to enable a smooth folding operation of the chair. At this time, the reference point "a", the center point "b", and the moving point "c" are arranged in a substantially triangular shape.

That is, the spring 80 functions to apply an external force in order to prevent an arbitrary motion in the unfolded state or folded state of the body part 10, and apply a tension in order to facilitate the folding operation or the unfolding operation.

Figure 8:
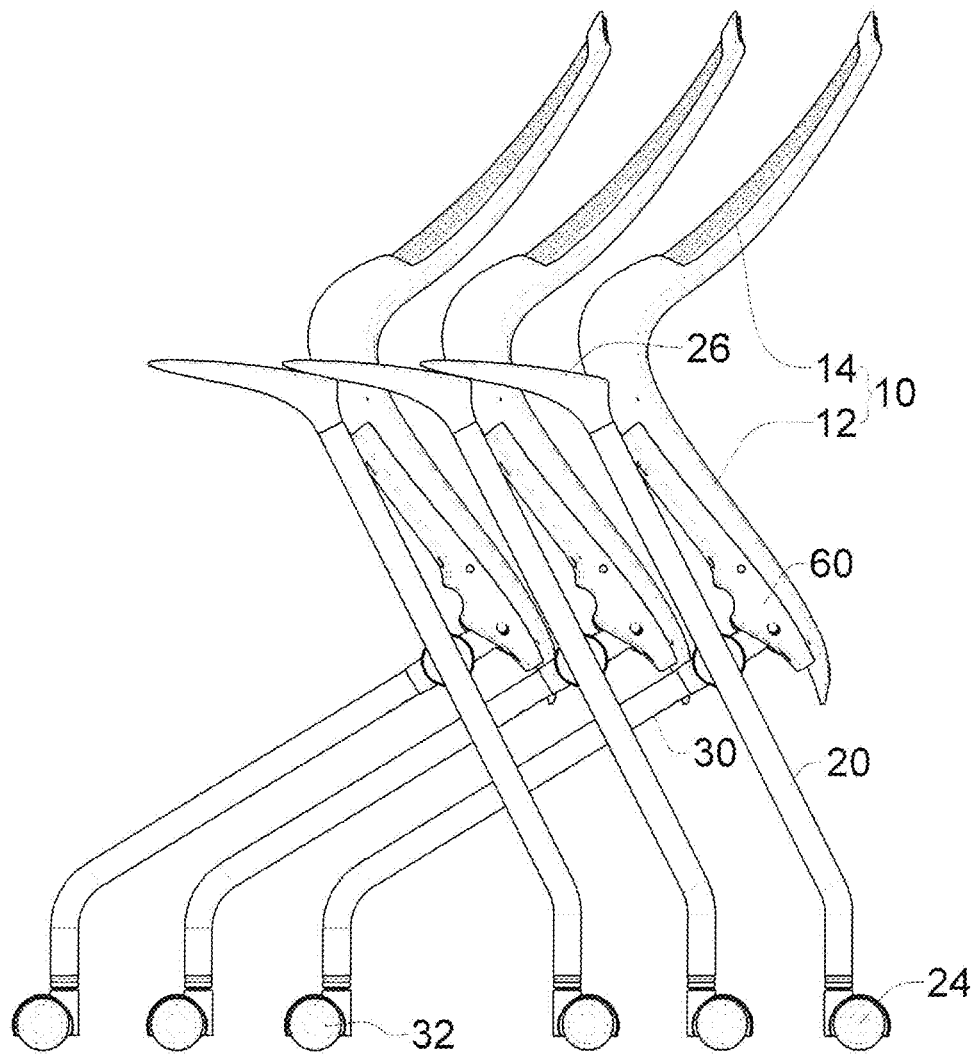
FIG. 8 is a view showing the state in which a plurality of assembly-type chairs are stacked from front to back according to the present disclosure.

Meanwhile, a large number of chairs may be stacked in close contact with each other from front to back in the state in which the body part 12 of the chair is to folded by a predetermined angle, as shown in FIG. 8. This makes it possible to efficiently store a large number of chairs even in a small space, and it is possible to effectively and simultaneously transport a large amount of chairs using the casters 24 and 32 provided in the respective support legs 20 and 30.

Although the preferred embodiment of the present disclosure has been illustrated and described above, the present disclosure is not limited to the above-described specific embodiment. In addition, the present disclosure may be variously changed and modified by those skilled in the art without departing from the scope of the present disclosure claimed in the claims, and the changes and modifications are not to be understood individually from the technical spirit or prospect of the present disclosure.

What is claimed is:
1. An assembly-type chair comprising:
a body part including a seat part and a backrest, which are integrally formed;
a horizontal bar horizontally disposed under the body part;
a pair of rotating members fixed to a lower surface of the body part so as to be parallel with each other and rotatable by a predetermined angle about the horizontal bar;
a pair of front support legs, each including a rod member having a predetermined length;

a pair of rear support legs, each including a rod member having a predetermined length; and a pair of connectors fixed to both ends of the horizontal bar, respectively, to each of which one front support leg and one rear support leg are mounted, wherein each connector is formed in a tube having a "T" shape, and has a front insertion protrusion integrally coupled to one end thereof so as to be inserted and mounted into the horizontal bar and a coupling protrusion integrally coupled to the lower end thereof so as to be mounted to the upper end of one of the rear support leg, and wherein a rear insertion protrusion is formed to protrude from a portion at a predetermined height in the front support leg so as to pass through one of the connectors to be received in the front insertion protrusion;

wherein armrests in the form of a bar are fixed to the upper ends of the front support legs so as to be located on both sides of the seat plate; and wherein the pair of rotating members is fixed to a plurality of screw fastening portions protruding from the lower surface of the seat plate, each rotating member comprising a body having a bar shape, is mounted to the horizontal bar so as to be rotatable by means of a rotation shaft passing through rotation-shaft through-holes thereof in the state in which the lower surface of the front end portion of the body having a bar shape is seated on a protrusion of the horizontal bar, and has a horizontal-bar seating groove formed to be recessed at a predetermined position of the lower surface of the body corresponding to the horizontal bar so as to be selectively seated on the horizontal bar.

2. The assembly-type chair of claim 1, further comprising a spring installed in one of the rotating members, wherein one end of the spring is associated with the rotating member by means of a first spring mounting member, and wherein the opposite end of the spring is associated with the protrusion of the horizontal bar by means of a second spring mounting member.

3. The assembly-type chair of claim 2, wherein the spring is configured to be in a horizontal state while being contracted when the seat plate is unfolded and be in a vertical state while being extended when the seat plate is folded.

\* \* \* \* \*

UNITED STATES PATENT AND TRADEMARK OFFICE
CERTIFICATE OF CORRECTION

| | | |
|---|---|---|
| PATENT NO. | : 11,486,431 B2 | Page 1 of 1 |
| APPLICATION NO. | : 16/843120 | |
| DATED | : November 1, 2022 | |
| INVENTOR(S) | : Geon Woo Kim | |

It is certified that error appears in the above-identified patent and that said Letters Patent is hereby corrected as shown below:

On the Title Page

Item [30], insert:
--2019-07-19 KR 10-2019-0087494--

Signed and Sealed this
Thirteenth Day of December, 2022

Katherine Kelly Vidal
*Director of the United States Patent and Trademark Office*